(12) United States Patent
Terahara

(10) Patent No.: US 8,405,922 B2
(45) Date of Patent: Mar. 26, 2013

(54) LENS BARREL AND IMAGING DEVICE AND HAND-HELD DATA TERMINAL DEVICE INCLUDING THE SAME

(75) Inventor: Daisuke Terahara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 13/020,308

(22) Filed: Feb. 3, 2011

(65) Prior Publication Data

US 2011/0194194 A1  Aug. 11, 2011

(30) Foreign Application Priority Data

Feb. 5, 2010 (JP) .................. 2010-023719

(51) Int. Cl.
*G02B 7/02* (2006.01)
(52) U.S. Cl. .................................................... 359/826
(58) Field of Classification Search .................. 359/819, 359/822, 823, 826; 396/348–350
See application file for complete search history.

(56) References Cited

U.S. PATENT DOCUMENTS

| 7,832,945 B2 | 11/2010 | Nuno |
| 7,864,446 B2 | 1/2011 | Terahara |
| 2003/0035224 A1* | 2/2003 | Nishimura et al. ........... 359/699 |

FOREIGN PATENT DOCUMENTS

| JP | 4224051 | 11/2008 |
| JP | 2009-198876 | 9/2009 |
| JP | 4463034 | 2/2010 |
| JP | 2010-72251 | 4/2010 |

\* cited by examiner

*Primary Examiner* — Darryl J Collins
(74) *Attorney, Agent, or Firm* — Oblon, Spivak, McClelland, Maier & Neustadt, L.L.P.

(57) ABSTRACT

A lens barrel includes a plurality of lens groups including first and second lens groups positioned closer to an imaging plane than the first lens group, a plurality of lens group frames including first and second lens group frames holding the first and second lens groups, respectively, a rotary cylinder to engage with the first lens group frame via a cam groove, surround the first lens group frame and be rotated around an optical axis to move the first lens group in the optical axis direction, a rotation transmission system to transmit a rotary force of the rotary cylinder, and a second frame driver provided inside of the first lens group frame and engaging with the second lens group frame via a cam groove to move the second lens group in the optical axis direction by the rotary force of the rotary cylinder transmitted via the rotation transmission system.

6 Claims, 9 Drawing Sheets

LENS BARREL AND IMAGING DEVICE AND HAND-HELD DATA TERMINAL DEVICE INCLUDING THE SAME

CROSS REFERENCE TO RELATED APPLICATION

The present application is based on and claims priority from Japanese Patent Application No. 2010-23719, flied on Feb. 5, 2010, the disclosure of which is hereby incorporated by reference in its entirety.

BACKGROUND OF THE INVENTION

1. Field of the Invention

The present invention relates to a lens barrel in which at least two or more lens groups are moved in an optical axis direction as well as to an imaging device and a hand-held data terminal device incorporating such a lens barrel.

2. Description of the Prior Art

There has been a strong demand for an imaging device such as a digital still camera or a digital video camera (hereinafter, digital camera) to improve its portability along with photographic performance. In order to aim to satisfy the demand, Japanese Patent No. 4224051 discloses an imaging device which comprises a lens barrel incorporating a focal-length variable photographic lens system made of plural lens groups. Such a lens barrel is configured to be collapsed into a chassis of a camera at non-photographing and be moved out from the chassis so that the lens groups are positioned with appropriate intervals for photographing. This imaging device excels in portability owing to the collapsible lens barrel and can shoot a subject at a desired angle of field by changing a focal length.

However, there is a problem with such an imaging device in terms of positioning cam grooves for moving lens group frames. That is, in the imaging device the lens barrel includes cylinder elements for holding the lens groups and two cam grooves are formed in the inner wall of a middle cylinder rotatable around a fixed cylinder element and movable in optical axis direction. The two cam grooves are used for moving a front cylinder element holding a first lens group and a second lens group frame holding a second lens group, respectively. It is necessary to determine the positions of the two cam grooves appropriately. Meanwhile, aiming for improving portability of the device, the middle cylinder is required to be decreased in size so that the size of the inner wall thereof is limited. This may make it difficult to freely design the cam grooves. Furthermore, the there may be no freedom in which a system for moving the photographic lens system and each lens group is designed, which makes it hard to improve the photographic performance of the imaging device.

It is possible to provide two extendable nested rotary cylinder elements rotatable around the fixed cylinder element and movable in the optical axis direction for the first and second lens groups, respectively. In this case one cam groove is formed on an front end (object side) of one rotary cylinder element to move the first lens group while the other cam groove is formed in the other rotary cylinder element to move the second lens group. However, such a configuration leads to an increase in the size of the lens barrel by the additional rotary cylinder and its relative components.

SUMMARY OF THE INVENTION

The present invention aims to provide a lens barrel which can improve the degree of freedom in which two cam grooves for moving two lens groups are designed without increasing the size of the lens barrel.

According to one aspect of the present invention, a lens barrel including a plurality of lens groups which are shifted to be in a shooting state in which at least a part of the lens groups is moved in an optical axis direction and in a collapsed state in which the lens groups are accommodated in a camera body by collapsing at least a part of the lens groups, comprises the plurality of lens groups including a first lens group and a second lens group positioned closer to an imaging plane than the first lens group; a plurality of lens group frames including first and second lens group frames holding the first and second lens groups, respectively; a rotary cylinder configured to engage with the first lens group frame via a cam groove and surround the first lens group frame and be rotated around an optical axis so as to move the first lens group in the optical axis direction; a rotation transmission system configured to transmit a rotary force of the rotary cylinder; and a second frame driver provided inside of the first lens group frame and configured to engage with the second lens group frame via a cam groove so as to move the second lens group in the optical axis direction relative to the first lens group frame by the rotary force of the rotary cylinder transmitted via the rotation transmission system.

BRIEF DESCRIPTION OF THE DRAWINGS

The features, embodiments, and advantages of the present invention will become apparent from the following detailed description with reference to the accompanying drawings.

DETAILED DESCRIPTION OF THE PREFERRED EMBODIMENTS

Hereinafter, embodiments of the present invention will be described in detail with reference to the accompanying drawings.

First Embodiment

Figure 1:
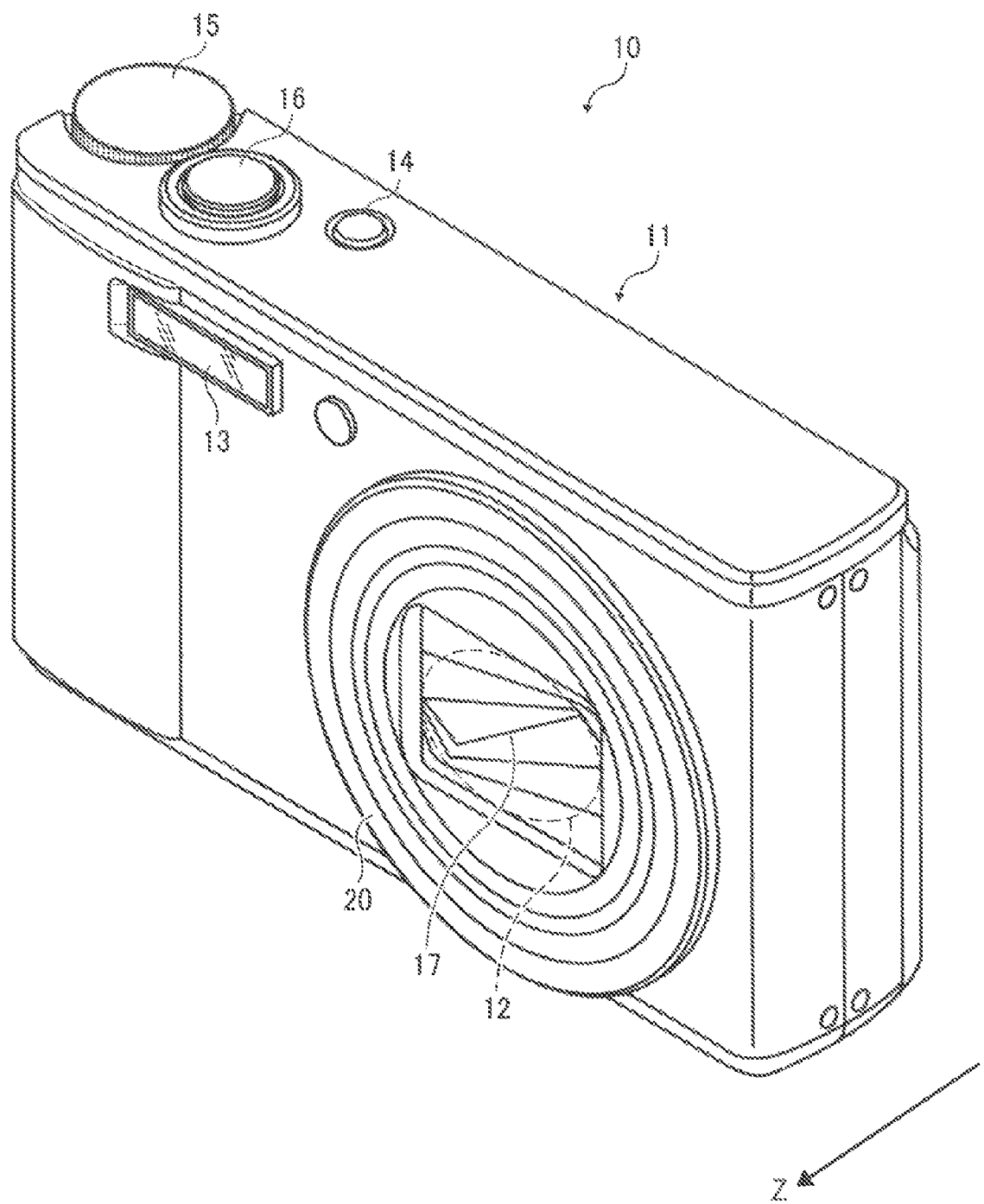
FIG. 1 is a perspective view of a digital camera 10 as an example of an imaging device according to one embodiment of the present invention.
Figure 2:
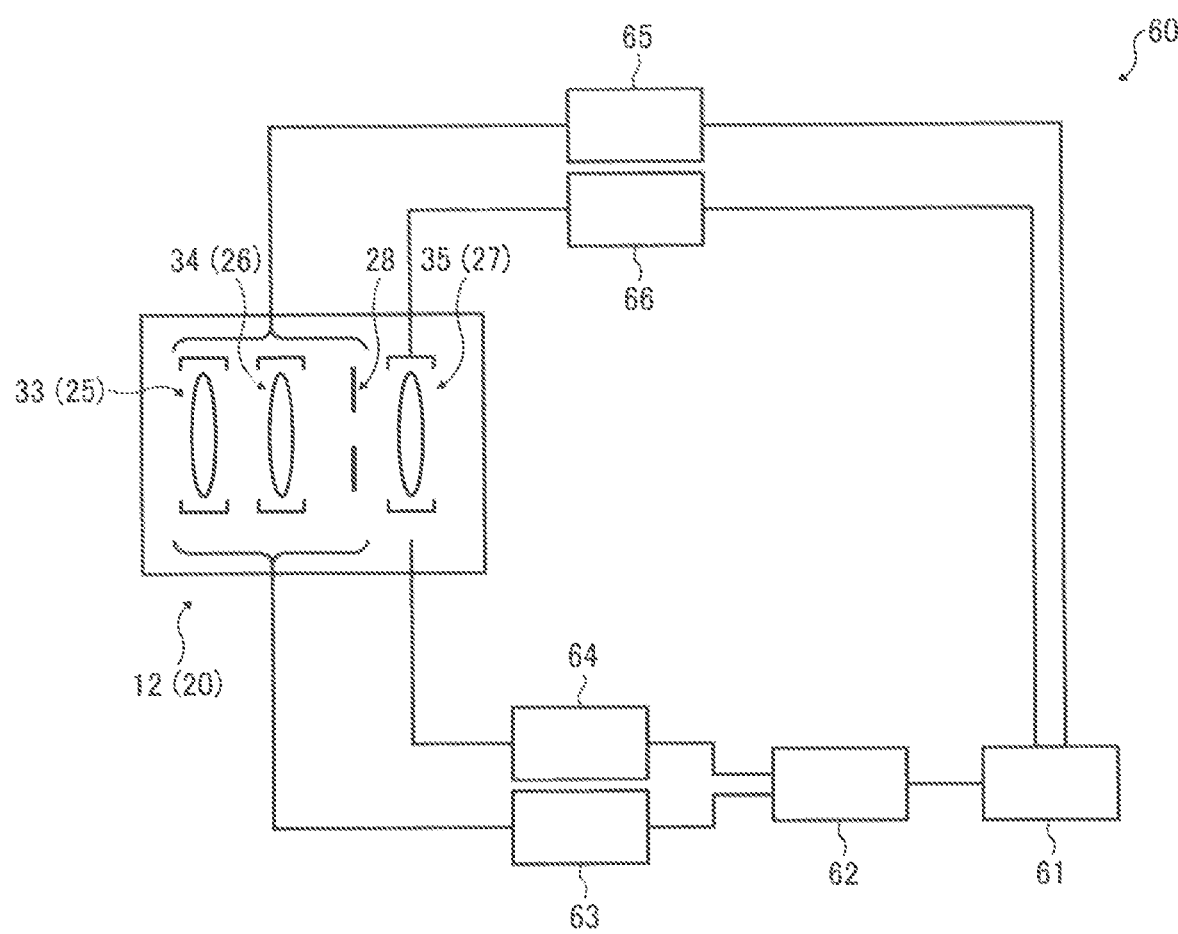
FIG. 2 shows a control block for a lens barrel 20 of the digital camera 10.
Figure 3:
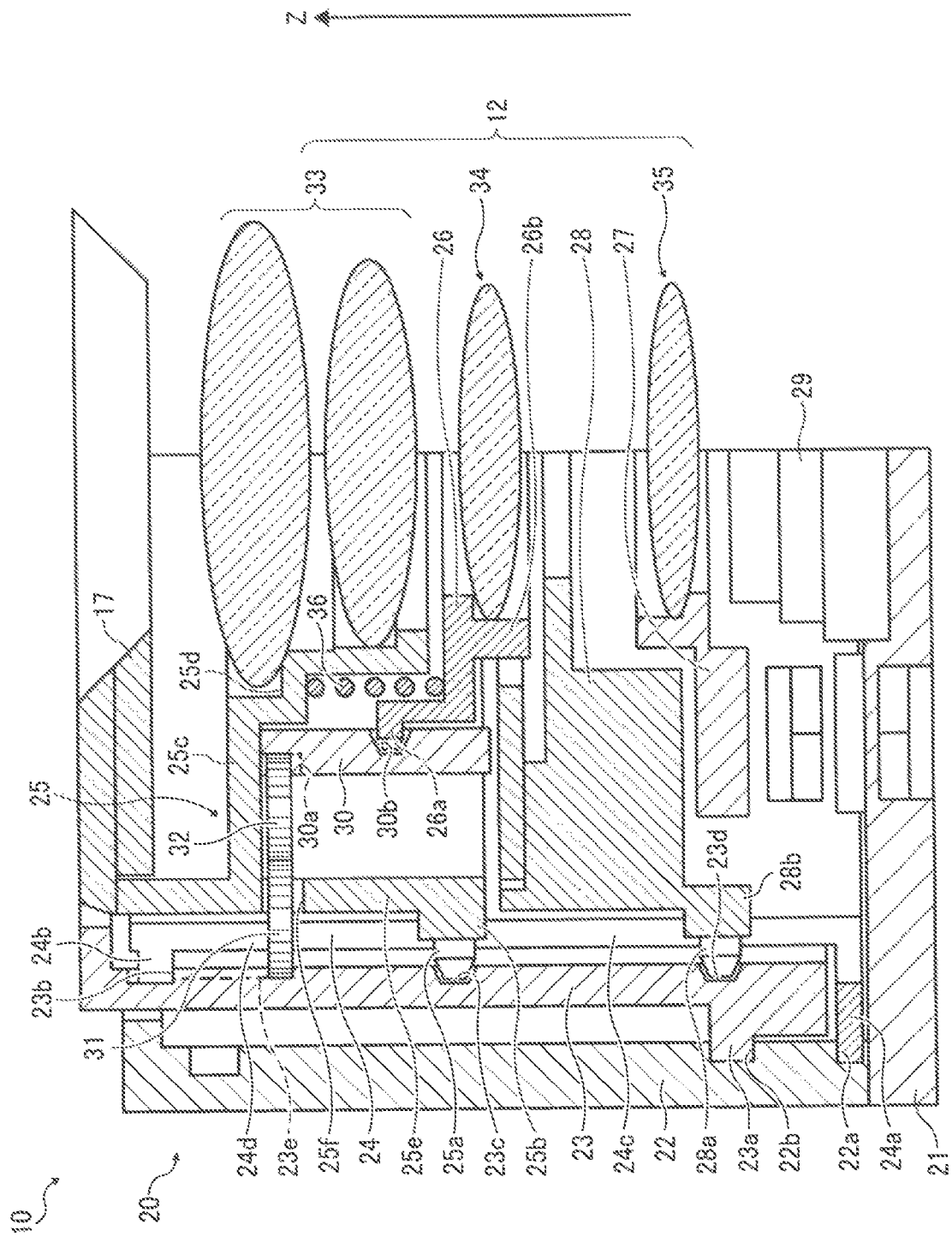
FIG. 3 schematically shows the structure of the lens barrel 20.

Referring to FIGS. 1 to 3, a digital camera 10 is described as an example of an imaging device incorporating a lens barrel according to a first embodiment of the present invention.

In FIG. 1 the digital camera 10 comprises a lens barrel 20 in which an optical system 12 is mounted, and a stroboscopic unit 13 on the front face of a camera body 11. On the top face, a power button 14 activating the entire digital camera 10, a mode dial 15, and a shutter button 16 are provided.

The mode dial 15 is for setting various scene modes, a still image mode, a video mode, and else. The shutter button 16 is pressed to shoot a subject. In the digital camera 10, upon the shutter button 16 pressed, image data of a subject from light received on an image sensor 29 (FIG. 3) via the optical system 12 is recorded.

Figure 11:
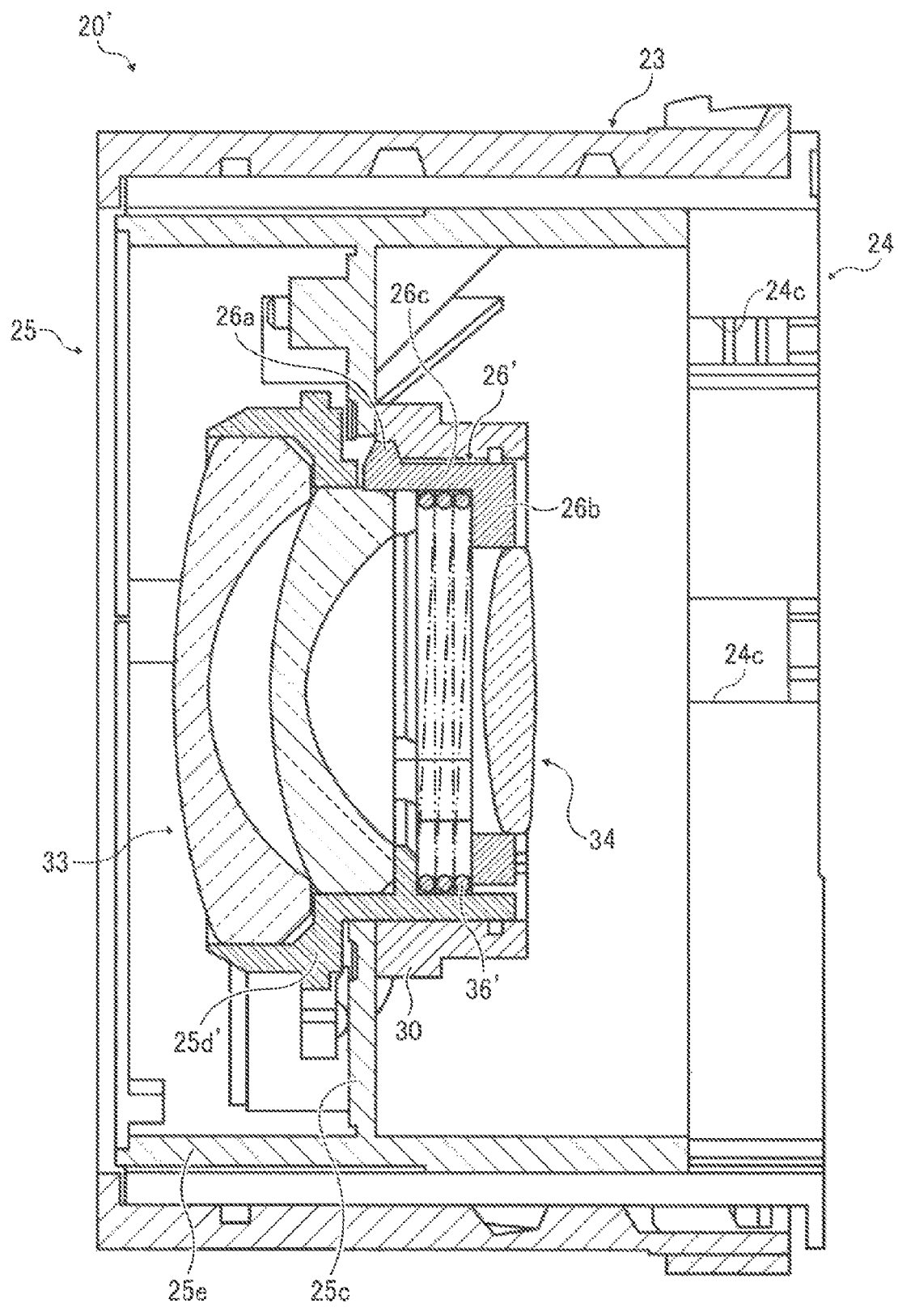
FIG. 11 is a cross sectional view of the lens barrel 20' in a collapsed state.
Figure 11:
Figure 12:
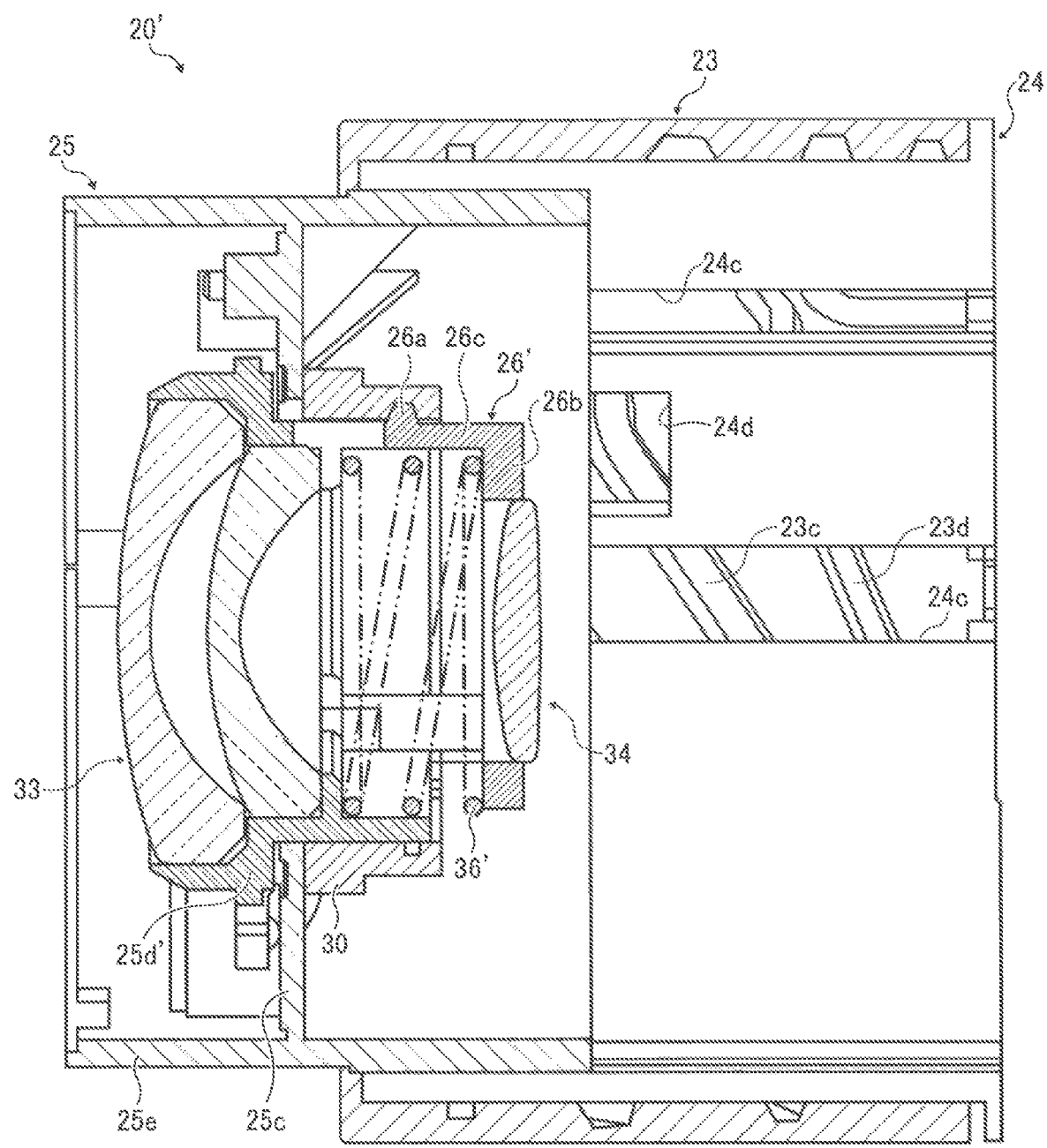
FIG. 12 is a cross sectional view of the lens barrel 20' in a shooting standby state.

The optical system 12 is comprised of three lens groups as later described (FIGS. 2, 3). The lens barrel 20 is movable along the optical axis of the optical system 12 (hereinafter, optical axis) between a predetermined collapsed position (FIG. 11) and a predetermined shooting standby position (FIG. 12). The digital camera 10 in FIG. 1 is powered off, therefore, the optical system 12 is at the collapsed position in a lens barrel unit (camera body 11) and one of a first lens group 33 closest to the object is protected by an openable lens barrier cover 17. Herein, the optical axis direction of the optical system 12 is defined as a Z-axis direction and a plane orthogonal to the axis is defined as X to Y plane.

In FIG. 2 the lens barrel 20 is moved by a lens barrel driver unit 60 in the optical axis (Z-axis) direction between the predetermined collapsed position and the predetermined shooting standby position. The lens barrel driver unit 60 comprises a CPU 61, a motor driver 62, a rotary cylinder motor 63, a third lens group motor 64, a rotary cylinder detector 65, and a third lens group detector 66. The CPU 61 gives the motor driver 62 instructions as to initial setting, a motor to drive, drive voltage setting, drive direction and the like. The motor driver 62 controls the rotary cylinder motor 63 and the third lens group motor 64 to drive according to the instructions from the CPU 61.

The rotary cylinder motor 63 rotates the rotary cylinder 23 (FIG. 3) to move a first lens group frame 25, a second lens group frame 26, and a shutter frame 28 as later described. The first lens group frame 25 and second lens group frame 26 hold first and second lens groups 33, 34, respectively. The third lens group motor 64 moves the third lens group frame 27 holding a third lens group 35.

The CPU 61 acquires a position data signal detected by the rotary cylinder detector 65 and the third lens group detector 66, to properly control the rotary posture of the rotary cylinder 23 and the position of the third lens group frame 27 (third lens group 35) based on the position data signal.

Next, the general structure of the lens barrel 20 according to the present embodiment is described with reference to FIG. 3. The lens barrel 20 comprises a wall element 21, a fixed cylinder 22, a rotary cylinder 23, a liner 24, the first lens group frame 25, the second lens group frame 26, the third lens group frame 27, the shutter frame 28, the image sensor 29, a rotary frame 30, a first gear 31, a second gear 32, a first lens group 33, a second lens group 34, and a third lens group 35.

The lens barrel 20 contains the first lens group 33, second lens group 34, and third lens group 35 of the optical system 12 in this order in the Z-axis direction. In the optical system 12 (lens barrel 20) the respective lens groups are moved properly in the Z-axis direction by the lens barrel driver unit 60 to control a focal length, and the third lens group 35 as a focus lens is properly moved in the Z-axis direction to perform focus control.

The image sensor 29 as a CCD or the like is provided on a wall element 21 of a flat plate on the Z-axis of the optical system 12. The fixed cylinder 22 is attached to the wall element 21. A concavity 22 to fix the liner 24 and a ring-like groove 22b to rotate the rotary cylinder 23 and prevent it from moving in the Z-axis direction are formed in the inner wall of the fixed cylinder 22. The concavity 22a is formed by cutting the inner wall of the fixed cylinder 22 to engage with a convex 24a of the liner 24 along the X to Y plane and fix the liner 24. The ring-like groove 22b is formed by cutting the inner wall of the fixed cylinder 22 in a concave shape to extend long along the X to Y plane (at the same height in FIG. 3), engage with a later-described slide protrusion 23a of the rotary cylinder 23 and relatively move the rotary cylinder 23 in a circumferential direction. The rotary cylinder 23 is placed inside the fixed cylinder 22.

The rotary cylinder 23 includes a slide protrusion 23a at a base end (bottom in FIG. 3) which is slidably engaged with the ring-like groove 22b of the fixed cylinder 22. By engagement of the slide protrusion 23a and the ring-like groove 22b, the rotary cylinder 23 can rotate without changing the position relative to the fixed cylinder 22 in the Z-axis direction. It is configured to rotate inside the fixed cylinder 22 by a rotary force from the rotary cylinder motor 63 (FIG. 2) of the lens barrel driver unit 60.

Further, the rotary cylinder 23 includes, on the inner wall, a ring-like groove 23b, first cam grooves 23c, a second cam groove 23d, and an inner wall groove 23e. The ring-like groove 23b is formed by cutting the inner wall of the rotary cylinder 23 in a concave shape to extend long along the X to Y plane (at the same height in FIG. 3), engage with a later-described convex 24b of the liner 24 and relatively move the engaged convex 24b in a circumferential direction. Thereby, it allows the liner 24 to rotate and prevents it from moving in the optical axis direction. The first cam grooves 23c are formed by cutting the inner wall of the rotary cylinder 23 to helicoidally extend long changing the position in the Z-axis direction in accordance with a rotary position of the rotary cylinder 23 in the circumferential direction. Also, they engage with cam pins 25a of the first lens group frame 25 along the X to Y plane to guide the cam pins 25a and move the first lens group frame 25. The second cam groove 23d is formed closer to the base end (bottom in FIG. 3) than the first cam grooves 23c by cutting the inner wall of the rotary cylinder 23 to helicoidally extend long changing the position in the Z-axis direction in accordance with a rotary position of the rotary cylinder 23 in the circumferential direction. Also, it engages with a cam pin 28a of the shutter frame 28 along the X to Y plane to guide the cam pin 28a and move the shutter frame 28. The inner wall groove 23e is formed in a toothed shape on the inner wall of the rotary cylinder 23 in the circumferential direction at a position closer to a top end (FIG. 3) than the first cam grooves 23c so as to engage with a first gear 31 along the X to Y plane. The inner wall groove 23e extends in the circumferential direction in a range of angles at which the rotary cylinder 23 and the first lens group frame 25 are relatively rotatable, and extends in the Z direction in an area in which the rotary cylinder 23 and the first gear 31 are relatively rotatable. The liner 24 is provided inside the rotary cylinder 23.

The liner 24 in a cylindrical form includes a convex 24a at a bottom end and a convex 24b at a top end (in FIG. 3). The convex 24a is engageable with the concavity 22a of the fixed cylinder 22 while the convex 24b is slidably engageable with the ring-like groove 23b of the rotary cylinder 23. By engagement of the convex 24a and the concavity 22a, the liner 24 is fixed to the fixed cylinder 22 while by engagement of the convex 24b and the ring-like groove 23b, the rotary cylinder 23 is made rotatable relative to the fixed cylinder 22.

Further, the liner 24 includes a first notch 24c to guide a protrusion 25b of the first lens group frame 25 and a protrusion 28b of the shutter frame 28 and a second notch 24d to allow the first gear 31 to relatively move in the Z-axis direction (the border between the first and second notches 24c, 24d is indistinctive in FIG. 3). The first notch 24c is configured to penetrate through the circumferential wall of the liner 24 from the bottom end to the middle position in the Z-axis direction. It is engageable with the protrusion 25b of the first lens group frame 25 and the protrusion 28b of the shutter frame 28 to allow them to move in the Z-axis direction and prevent them from circumferentially moving. The second notch 24d is configured to penetrate through a predetermined area of the middle of the circumferential wall of the liner 24 in the Z-axis direction. It allows the first gear 31 to engage with the inner wall groove 23e and move to the liner 24 in the Z-axis direction.

In the lens barrel 20, the liner 24 is fixed to the fixed cylinder 22 by engagement of the convex 24a and the concavity 22a while the rotary cylinder 23 is rotatable around the Z-axis and prevented from moving in the Z-axis direction relative to the fixed cylinder 22 and the liner 24 by engagement of the slide protrusion 23a and the ring-like groove 22b and engagement of the convex 24b and the ring-like groove 23b.

Alternatively, the lens barrel 20 can be configured that the rotary cylinder 23 is rotated to move out from the fixed cylinder 22 and the liner 24 is not rotated but moved out therefrom along with the rotary cylinder 23. In this case the ring-like groove 22b can be a helicoidal cam groove which extends in the inner wall of the fixed cylinder 22 changing the position in the Z-axis (optical axis) direction in accordance with a rotary position of the rotary cylinder 23 in the circumferential direction. The concavity 22a can be a straight groove extending in the Z-axis direction in the inner wall of the fixed cylinder 22.

The first lens group frame 25 is disposed inside the liner 24 to movably hold the first lens group 33 in the Z-axis direction. The first lens group frame 25 includes at a middle position an intermediate wall 25c orthogonal to the axial line and a stepped tubal portion 25d formed on the intermediate wall 25c to support the first lens group 33. Further, it includes, at a back end (image sensor 29 side) of an outer wall 25e, the protrusion 25b protruding outward radially with a cam pin 25a protruding outward radially. The both side faces of the protrusion 25b in the circumferential direction are in a size to fit into the first notch 24c of the liner 24 and be slidable in the Z-axis direction. The cam pin 25a inserts through the first notch 24c of the liner 24, and is formed in a size to engage with the first cam groove 23c of the rotary cylinder 23 and be slidable in the first cam groove 23c. Thus, the first lens group frame 25 is movable in the Z-axis direction without rotating relative to the liner 24 by engagement of the protrusion 25 and the first notch 24c. By engagement of the cam pin 25a and the first cam groove 23c, it is given a force from the rotation of the rotary cylinder 23 relative to the liner 24 and guided by the first notch 24c to move in the Z-axis direction without rotating relative to the liner 24 or the fixed cylinder 22.

Moreover, the first and second gears 31, 32 are formed on the intermediate wall 25c of the first lens group frame 25 to be rotatably engaged with each other. On the outer wall 25e provided is an opening 25f through which the first gear 31 is partially exposed. The first gear 31 is configured to insert through the opening 25f and the second notch 24d of the liner 24 and fit into the inner wall groove 23e of the rotary cylinder 23. The second gear 32 engaging with the first gear 31 fits into an outer wall groove 30a of a later-described rotary frame 30. The first and second gears 31, 32 function as a rotation transmission system to transmit to the rotary frame 30 a rotary force of the rotary cylinder 23 to the first lens group frame 25.

The rotary frame 30 is configured in a cylindrical form to surround the stepped tubal portion 25d and be rotatable relative to the tubal portion 25d or the first lens group frame 25. Although not shown, the rotary frame 30 is prevented from moving in the Z-axis direction relative to the tubal portion 25d or the first lens group frame 25. The rotary frame 30 includes an outer wall groove 30a at the top end of the outer wall and a cam groove 30b in the inner wall. The outer wall groove 30a is formed in a toothed shape in the circumferential direction to engage with the second gear 32 along the X to Y plane. The cam groove 30b is formed by cutting the inner wall of the rotary frame 30 to helicoidally extend long changing the position in the Z-axis direction in accordance with a rotary position of the rotary frame 30 in the circumferential direction. The rotary frame 30 is provided inside the first lens group frame 25 and functions as a second frame driver to move the second lens group frame 26 to the first lens group frame 25 in the Z-axis direction by a rotary force of the rotary cylinder 23 to the first lens group frame 25 transmitted via the rotation transmission system.

The second lens group frame 26 is provided inside the rotary frame 30. It is configured in a cylindrical form to movably hold the second lens group 34 to the first lens group frame 25 in the Z-axis direction, and includes a support portion 26b for supporting the second lens group 34. The second lens group frame 26 is held by the first lens group frame 25 so as not to be rotated but able to move in the Z-axis direction (not shown). It includes at a top end (in FIG. 3) a cam pin 26a protruding radially outward and formed in a size to slidably fit into the cam groove 30b of the rotary frame 30.

Coil springs 36 are provided as a bias element between the first and second lens group frames 25, 26 to bias the second lens group frame 26 to the image sensor 29 side (downward in FIG. 3). In FIG. 3 the coil springs 36 are arranged to surround the first (bottom) step of the tubal portion 25d of the first lens group frame 25 and extend along the inner wall of the second lens group frame 26.

The shutter frame 28 is provided on the image sensor 29 side of the second lens group frame 26 (second lens group 34) to movably hold a shutter (not-shown) and position it on the optical axis of the optical system 12. The shutter frame 28 in a cylindrical form is disposed inside the liner 24 and includes at a back end a protrusion 28b with a cam pin 28a both protruding radially outward. Both side faces of the protrusion 28b in the circumferential direction are in a size to slidably fit into the first notch 24c of the liner 24 in the Z-axis direction. The cam pin 28a is configured to insert through the first notch 24c and slidably fit into the second cam groove 23d of the rotary cylinder 23. Thus, the shutter frame 28 is not rotated relative to the liner 24 but movable in the Z-axis direction by engagement of the protrusion 28b and the first notch 24c. Also, by engagement of the cam pin 28a and the second cam groove 23d, the shutter frame 28 is given a force from the rotation of the rotary cylinder 23 and guided by the first notch 24c to move in the Z-axis direction without rotating relative to the liner 24 or the fixed cylinder 22.

The third lens group frame 27 is provided on the image sensor 29 side of the shutter frame 28. The third lens group frame 27 in a cylindrical form is configured to movably hold the third lens group 35 in the Z-axis direction. It is moved in the Z-axis direction by the third lens group motor 64 (FIG. 2) of the lens barrel driver unit 60 for focus adjustment.

In the lens barrel 20 (digital camera 10), the rotary cylinder 23 inside the fixed cylinder 22 is rotated by the rotary cylinder motor 63 (FIG. 2) of the lens barrel driver unit 60 without changing the position in the Z-axis direction. Along with the rotation of the rotary cylinder 23, the first lens group frame 25 (first lens group 33) and the shutter frame 28 are moved along the first cam groove 23*c* and the second cam groove 23*d* in the Z-axis direction while prevented from rotating by the liner 24 (first notch 24*c*). Then, the rotary cylinder 23 and the first lens group frame 25 are relatively rotated to rotate the first gear 31 engaging with the inner wall groove 23*e* of the rotary cylinder 23 and the second gear 32 engaging with the first gear 31. By engagement of the outer wall groove 30*a* and the second gear 32, the rotary frame 30 inside the first gear 31 is rotated without changing the position relative to the first gear 31 in the Z-axis direction. That is, the rotary frame 30 rotates relative to the first lens group frame 25, changing the position relative to the rotary cylinder 23 and the liner 24 in the Z-axis direction together with the first lens group frame 25. The second lens group frame 26 is not rotated relative to the first lens group frame 25 but moved in the Z-axis direction by engagement of the cam pin 26*a* and the cam groove 30*b* of the rotating rotary frame 30.

Thus, the lens barrel 20 (digital camera 10) is configured that the rotation of the rotary cylinder 23 leads to moving the first lens group frame 25 holding the first lens group 33 in the Z-axis direction. Inside the first lens group frame 25 (outer wall 25*e*), the rotary frame 30 surrounds the tubal portion 25*d* actually supporting the first lens group 33 and is rotated by receiving a rotary force to the rotary cylinder 23 to move the second lens group frame 26 (second lens group 34) by engaging with the cam groove 30*b* via the cam pin 26*a* in the Z-axis direction to the first lens group frame 25.

Therefore, according to the lens barrel 20 (digital camera 10), it is possible to improve the degree of freedom in which the first cam groove 23*c* and the cam groove 30*b*, which guide the first and second lens group frames 25, 26 in the inner wall of the rotary cylinder 23 and in the inner wall of the rotary frame 30 respectively, are designed. A length of a collapsed lens barrel 20 in the optical axis direction is determined by a length of the optical system 12 or of the rotary cylinder 23 in the optical axis direction. Because of this, it is preferable to decrease the length of the rotary cylinder 23 in the optical axis direction as much as possible and arrange the lens groups (first and second lens groups 33, 34 in the present embodiment) to be as close as possible to each other. With provision of two cam grooves for the first and second lens group frames 25, 26 on the inner walls of the rotary cylinder 23, however, the two cam grooves may be too close to each other or overlap with each other in the Z-axis direction. With proper strength (rigidity) of the two cam grooves and their respective cam pins and the rotary cylinder 23 taken into consideration, a position of one cam groove is restricted by that of the other and the degree of designing freedom cannot be maintained unless the length of the rotary cylinder 23 in the optical axis direction is increased. The designing of the cam grooves affects the positions of the lens groups in shooting, that is, the lens design of the optical system 12, makes it difficult to improve shooting performance of the camera. In view of solving such a problem, according to the lens barrel 20 in the present embodiment, the first cam groove 23*c* and the cam groove 30*b* for moving the first and second lens group frames 25, 26 (first and second lens groups 33, 34) are provided separately in the inner wall of the rotary cylinder 23 and in the inner wall of the rotary frame 30, respectively, which enables an increase in the degree of freedom in which both of the cam grooves 23*c* and 30*b* are designed without an increase in the length of the rotary cylinder 23 in the optical axis direction.

The lens barrel 20 (digital camera 10) is configured that the rotary frame 30 inside the first lens group frame 25 (outer wall 25*e*) surrounds the tubal portion 25*d* as a support for the first lens group 33 and is rotated by receiving a rotary force to the rotary cylinder 23 so as to move the second lens group frame 26 relative to the first lens group frame 25 in the Z-axis direction by the engagement of the cam pins 26*a* of the second lens group frame 26 and the cam grooves 30*b* of the rotary frame 30. Because of this, it is possible to improve the degree of freedom in which the cam grooves for moving the first and second lens groups 33, 34 are designed without increasing the size of the lens barrel 20 or the digital camera 10. As described above, it is preferable that the lens groups (first and second lens groups 33, 34 in the present embodiment) are as close as possible to each other in a collapsed state while the length of the rotary cylinder 23 in the optical axis direction is set as small as possible. In order to achieve this, alternatively, the lens barrel 20 can be configured to include another rotary cylinder (hereinafter, second rotary cylinder) inside the rotary cylinder 23 having the cam grooves in the inner wall and another liner (hereinafter, second liner) and the second lens group frame inside this second rotary cylinder. However, this disadvantageously increases the size (diameter) of the lens barrel 20 in a direction orthogonal to the Z-axis direction by the additional second rotary cylinder and second liner. Meanwhile, in the lens barrel 20 according to the present embodiment, the rotary frame 30 for moving the first lens group frame 26 is provided inside the first lens group frame 25 to surround the tubal portion 25*d* supporting the first lens group 33. Therefore, it is possible to reduce the diameter of the lens barrel 20 in comparison with the above one including the second rotary cylinder and the second liner.

Moreover, according to the lens barrel 20 (digital camera 10) the second lens group frame 26 is biased to the image sensor 29 side (downward in FIG. 3) and positioned relative to the first lens group frame 25 by the coil springs 36. This allows the second lens group frame 26, especially in shooting standby position, to be positioned relative to the first lens group frame 25 freely from a backlash of components for moving the second lens group frame 26 (due to a looseness in engagement of the cam pins 26*a* and the cam grooves 30*b* or the like). Accordingly, the second lens group frame 26 can be moved smoothly relative to the first lens group frame 25 as well as the interval between the first and second lens groups 33, 34 can be set with precision. In FIG. 3 the coil springs 36 as a compression spring are provided between the first and second lens group frames 25, 26 by way of example. However, it should not be limited to such an example. Alternatively, a pulling spring as a pulling element can be provided between the first and second lens group frames 25, 26 to pull the second lens group frame 26 toward the first lens group frame 25 (object side).

According to the lens barrel 20 (digital camera 10), the rotation transmission system to transmit the rotary force of the rotary cylinder 23 to the first lens group frame 25 is comprised of the inner wall groove 23*e* in the inner wall of the rotary cylinder 23, a gear (first and second gears 31, 32 in the present embodiment) and the outer wall groove 30*a* in the outer wall of the rotary frame 30. Therefore, the rotary velocity of the rotary cylinder 23 or the moving amount of the first lens group frame 25 and the rotary velocity of the rotary frame 30 or the moving amount of the second lens group frame 26 are properly adjustable by setting a gear ratio of the inner wall groove 23*e* and the outer wall groove 30*a* appropriately. The rotary direction of the rotary frame 30 can be also set properly relative to the rotary cylinder 23 by changing the number of gears. Accordingly, the degree of freedom in which the two cam grooves 23*c*, 30*b* are designed can be improved.

Further, according to the lens barrel 20 (digital camera 10) the inner wall groove 23e constituting the rotation transmission system is formed in the inner wall of the rotary cylinder 23 closer to an object in the Z-axis direction than the first cam groove 23c for moving the first lens group frame 25. This enables an improvement in the degree of freedom of designing the second cam groove 23d for moving the shutter frame 28 as an optical element which is disposed on the image plane side of the second lens group 34 in the Z-axis direction, without decreasing the degree of freedom of designing the two cam grooves 23c and 30d for moving the first and second lens group frames 25, 26.

Thus, it is able to improve the degree of freedom of designing the two cam grooves for moving the first and second lens groups 33, 34 without increasing the size of the lens barrel 20 (digital camera 10).

Second Embodiment

Next, one example of the structure of the lens barrel according to a second embodiment will be described with reference to FIG. 4 to FIG. 12. A lens barrel 20' according to the second embodiment is structured the same as the lens barrel 20 in the first embodiment so that the same or like elements are given the same reference numbers and a detailed description thereon is omitted. Note that in FIGS. 4 to 12 the arrow Z indicates the optical axis direction (FIG. 1) when the lens barrel 20' is attached to the digital camera 10. Also, for the sake of simplicity, the wall element 21, fixed cylinder 22, third lens group frame 27 (third lens group 35), shutter frame 28 and image sensor 29 are not shown in FIG. 4 and FIGS. 11, 12.

Figure 4:
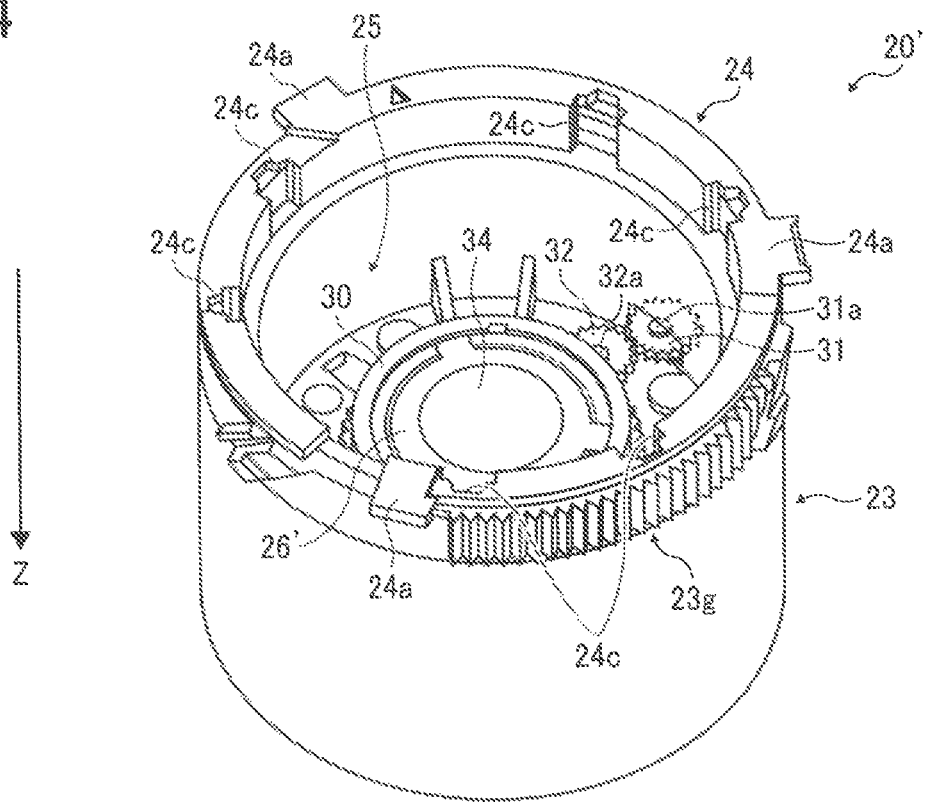
FIG. 4 shows positions of elements of the lens barrel 20' without a fixed cylinder 22, seen from the wall element 21.

FIG. 4 shows the position of the lens barrel 20' mounted seen from the wall element 21 without the fixed cylinder 22. In FIG. 4 the first lens group 33 is hidden by the second lens group frame 26' (second lens group 34) and else. In a space inside the fixed cylinder 22 attached to the wall element 21 (FIG. 2), the rotary cylinder 23, liner 24, first lens group frame 25, second lens group frame 26' (second lens group 34), rotary frame 30, first gear 31, second gear 32 are assembled in FIG. 4.

Figure 5:
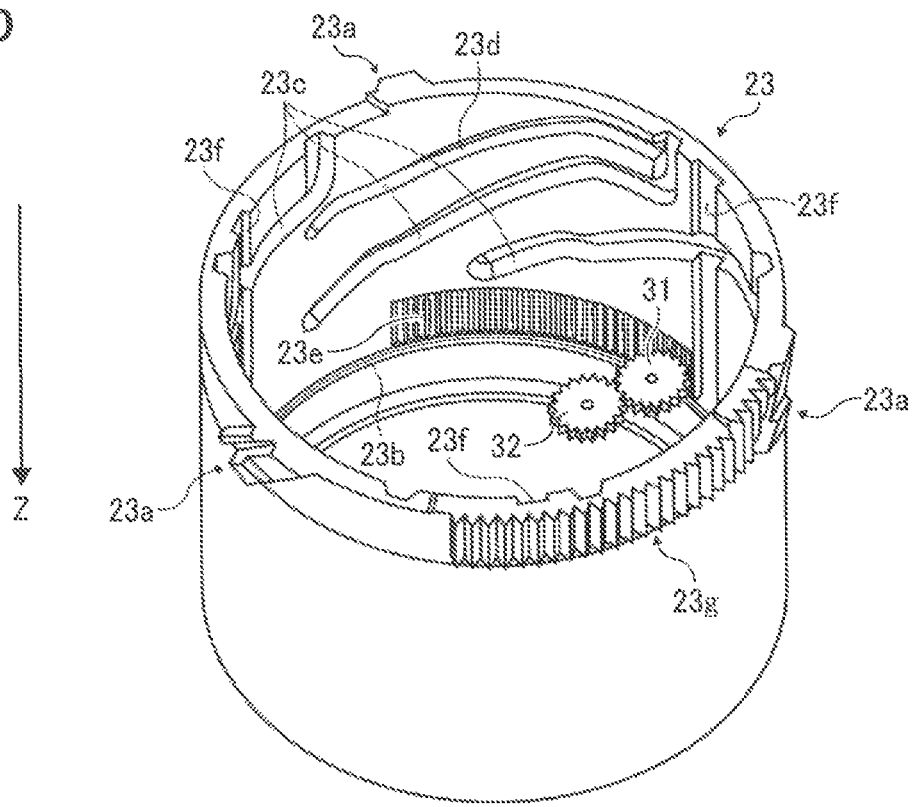
FIG. 5 is a perspective view of a rotary cylinder 23 seen from a base end (wall element 21)

FIG. 5 is a perspective view of the rotary cylinder 23 seen from the base end (wall element 21). The rotary cylinder 23 includes three slide protrusions 23a on the outer wall and a ring-like groove 23b, six first cam grooves 23c (only three shown in the drawing), three second cam grooves 23d (only one shown in the drawing), and the inner wall groove 23e on the inner wall.

The slide protrusions 23a and the second cam grooves 23d are provided with equal interval in the circumferential direction. The first cam grooves 23c are disposed below the ends (lower ends in the drawing) of the first cam grooves 23c and above the ring-like groove 23b in the Z-axis direction and extend in such a length to allow the relative movement of the rotary cylinder 23 and the first gear 31. The inner wall groove 23e is formed in a predetermined area in the circumferential direction (in a range of angles at which the rotary cylinder 23 and the first lens group frame 25 are relatively rotatable).

For placing the liner 24 from the base end (wall element 21 side), three grooves 23f (only two shown in the drawing) are formed in the inner wall of the rotary cylinder 23, to receive the convexes 24b and engage them with the ring-like grooves 23b. The grooves 23f are disposed with almost an equal interval and extend from the base end (top end in FIG. 5) to the ring-like groove 23b in the Z-axis direction. A gear groove 23g is formed on the outer wall of the rotary cylinder 23 to transmit a rotary force from the rotary cylinder motor 63 (FIG. 2) of the lens barrel driver unit 60 to the rotary cylinder 23. The gear groove 23g is formed of plural gear teeth arranged in an area in which the rotary cylinder 23 is rotatable inside the fixed cylinder 22 (FIG. 3). The liner 24 is placed inside the rotary cylinder 23 in FIG. 6.

Figure 6:
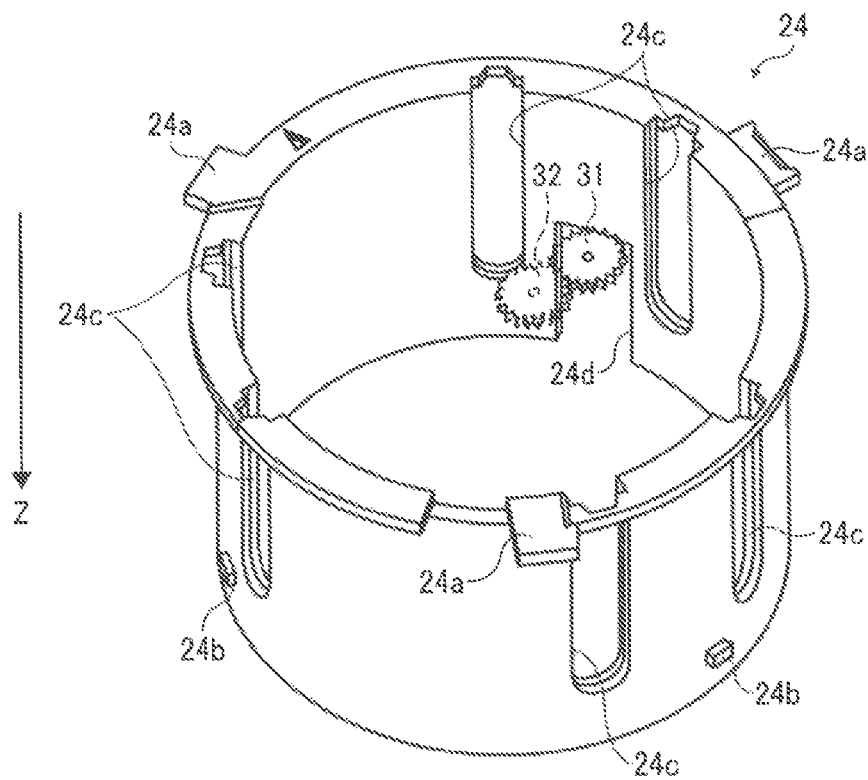
FIG. 6 is a perspective view of a liner 24 seen from the base end (wall element 21)

FIG. 6 is a perspective view of the liner 24 seen from the base end (wall element 21 side). The liner 24 includes a flange base end (top end in FIG. 6) on which three convexes 24a are formed, and three convexes 24b (only two shown in the drawing) on the outer wall. On the circumferential wall provided are six first notches 24c and a second notch 24d.

The first notches 24c are formed by cutting the circumferential wall of the liner 24 from the base end to a predetermined height. The predetermined height is the position of the protrusions 25b (cam pins 25a) of the first lens group frame 25 when moved to the shooting standby position (in FIG. 11) to approach the object most relative to the liner 24 (rotary cylinder 23) in the Z-axis direction. The first notches 24c are configured to penetrate through the flange base end and allow the protrusions 25b of the first lens group frame 25 and the protrusion 28b of the shutter frame 28 to insert therethrough in the Z-axis direction. With such a configuration, the first lens group frame 25 can be placed inside the liner 24 from the base end (wall element 21 side).

Figure 7:
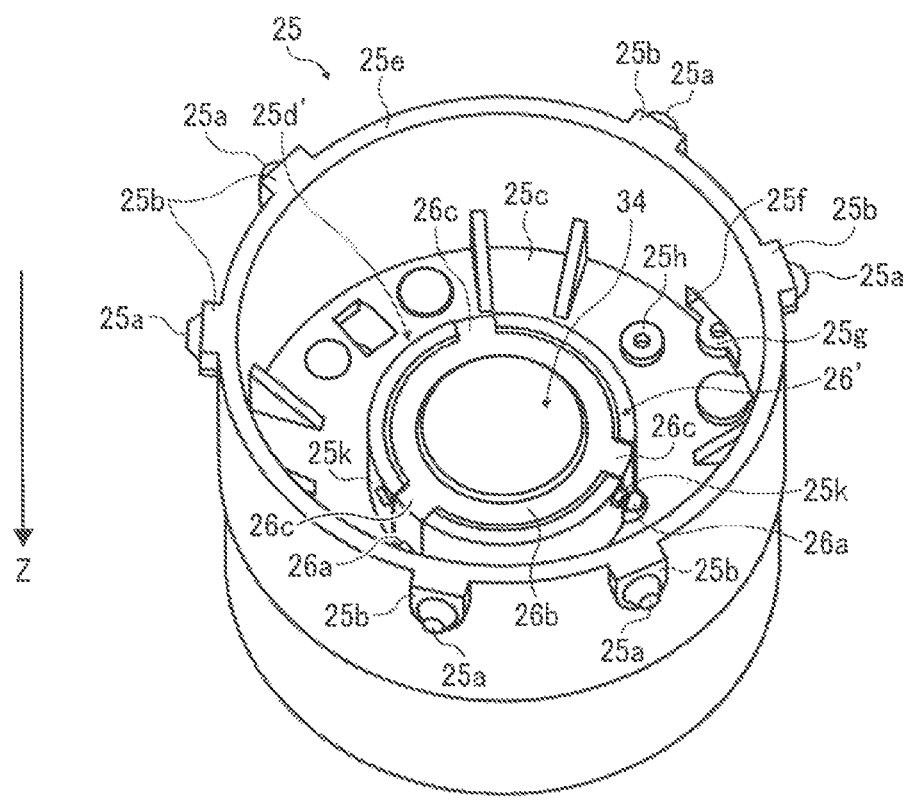
FIG. 7 shows a first lens group frame 25 disposed inside of the liner 24 when assembled with a second lens group frame 26' (second lens group 34) and a rotary frame 30.
Figure 8A:
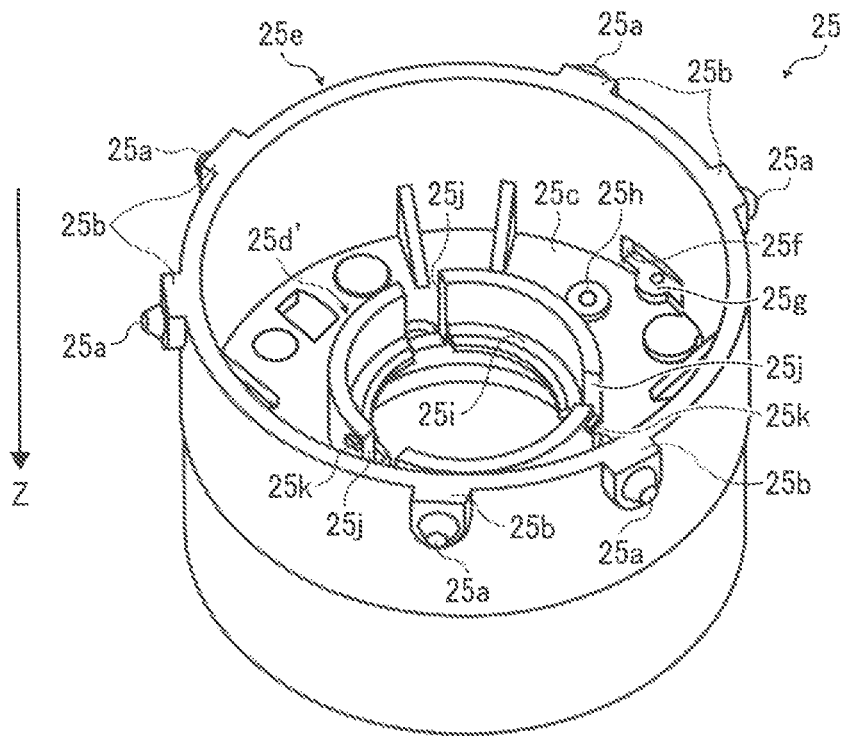
FIG. 8A is a perspective view of the first lens group frame 25 seen from the base end.
Figure 8B:
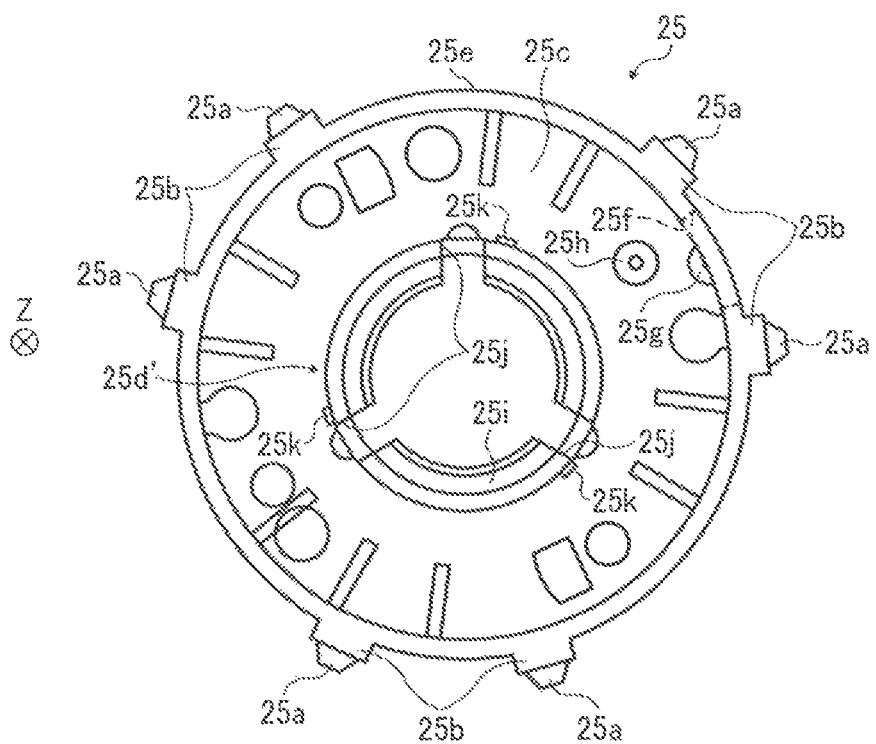
FIG. 8B is a front view of the same seen from upward (from an image sensor 29 in Z-axis (optical axis) direction)

The second notch 24d is formed by cutting the circumferential wall of the liner 24 from a predetermined height to the end (bottom end in the drawing). The predetermined height is a position of the first gear 31 of the first lens group frame 25 when moved to the collapsed position (in FIG. 12) to approach the image sensor 29 most relative to the liner 24 (rotary cylinder 23) in the Z-axis direction. The second notch 24d is configured to have such a length to allow the first gear 31 of the first lens group frame 25 to engage with the inner wall groove 23e of the rotary cylinder 23. FIG. 7 shows the first lens group frame 25 placed inside the liner 24 and assembled with the second lens group frame 26' (second lens group 34) and the rotary frame 30 and FIGS. 8A, 8b show the first lens group frame 25 only. FIG. 8A is a perspective view of the first lens group frame 25 seen from the base end while FIG. 8B is a front view of the same seen from above (the image sensor 29 side in the Z-axis direction).

In FIGS. 8A, 8B the first lens group frame 25 is in a cylindrical form and includes six cam pins 25a, six protrusions 25b and an opening 25f on the outer wall 25e. A mount 25g is formed in the opening 25f to rotatably support the first gear 31 on the intermediate wall 25c. In the vicinity of the mount 25g another mount 25h is formed to rotatably support the second gear 32. The first lens group frame 25 is made of the integrated intermediate wall 25c and outer wall 25e with the tubal portion 25d' attached thereto (FIGS. 11, 12) in the present embodiment.

Figure 9:
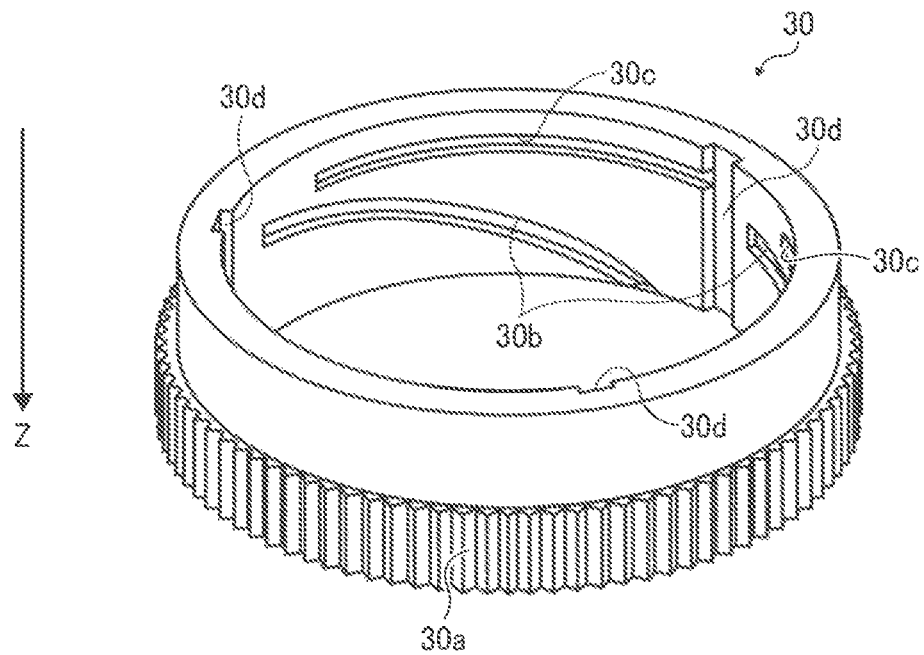
FIG. 9 is a perspective view of the rotary frame 30 seen from the base end.

The tubal portion 25d' supporting the first lens group frame 25 includes a mount flange 25i, three notches 25j and three protrusions 25k (only two shown in the drawing). The mount flange 25i is a stopper to contact from the object side with one lens of the first lens group 33 closest to the image sensor 29 and position it (FIGS. 11, 12). The notches 25j are formed by cutting of the tubal portion 25d' in the Z-axis direction, to slidably receive later-described leg portions 26c of the second lens group frame 26'. The notches 25j extend from an end of the tubal portion 25d' (top end in FIG. 8A), the mount flange 25i to the intermediate wall 25c and form dents on the surface of the intermediate wall 25c. The protrusions 25k radially protrude from the outer wall of the top end of the tubal portion 25d' and are slidably engageable with later-described ring-like grooves 30c of the rotary frame 30. A plurality of ribs are formed to bridge the intermediate wall 25c and the outer wall 25*e* of the first lens group frame 25. FIG. 9 shows the rotary frame 30 surrounding the tubal portion 25*d'* of the first lens group frame 25. FIG. 9 is a perspective view of the rotary frame 30 seen from the base end (wall element 21 side).

The rotary frame 30 in FIG. 9 is in a cylindrical form and includes an outer wall groove 30*a* at the bottom end of the outer wall and three cam grooves 30*b*, three ring-like grooves 30*c*, and three grooves 30*d* (only two each shown in the drawing) on the inner wall.

Figure 10:
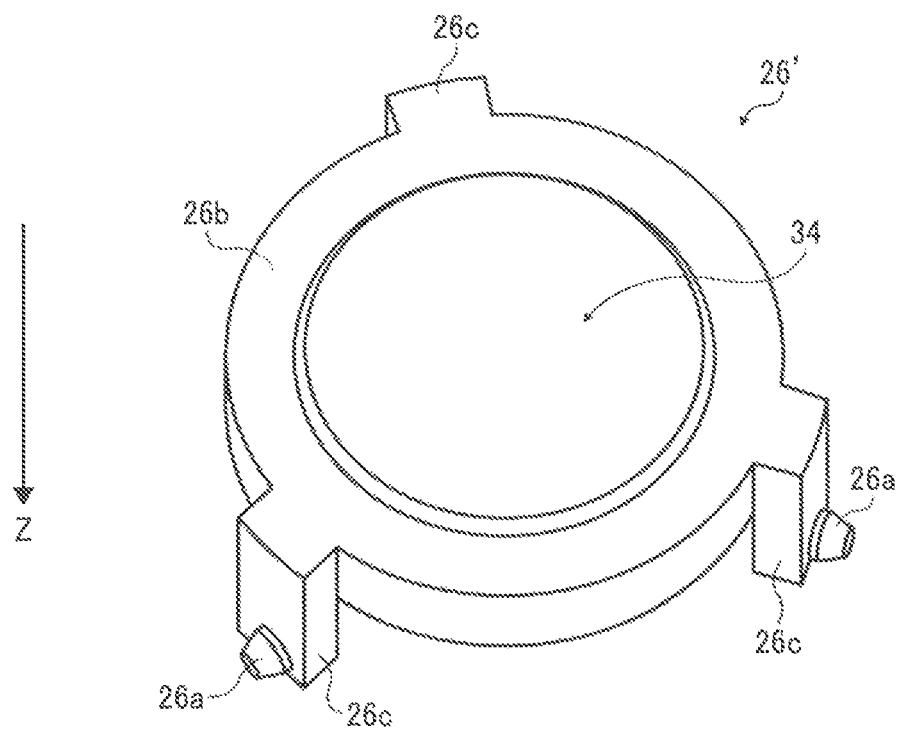
FIG. 10 is a perspective view of the second lens group frame 26' seen from the base end.

The ring-like grooves 30*c* are configured to slidably receive the protrusions 25*k* of the tubal portion 25*d'* of the first lens group frame 25, respectively, and allow the rotary frame 30 to be rotatable while prevented from moving in the Z-axis direction relative to the tubal portion 25*d'* or the first lens group frame 25. The grooves 30*d* are formed by cutting the inner wall in the Z-axis direction to connect with the ends of the corresponding ring-like grooves 30*c* in the circumferential direction. The grooves 30*d* are to receive the protrusions 25*k* of the tubal portion 25*d'* and engage them with the ring-like grooves 30*c* in placing the rotary frame 30 around the tubal portion 25*d'* of the first lens group frame 25 from the base end. FIG. 10 is a perspective view of the second lens group frame 26' disposed inside the rotary frame 30 seen from the base end.

The second lens group frame 26' comprises three cam pins 26*a* (only two shown in the drawing), a support portion 26*b* supporting the second lens group 34, and three leg portions 26*c*. The support portion 26*b* is in a ring form to surround the second lens group 34. The leg portions 26*c* are provided on the outer face of the support portion 26*b* with almost an equal interval in the circumferential direction, protrude in the radial direction and extend in the Z-axis direction (downward in FIG. 10). The leg portions 26*c* are insertable to the notches 25*j* (FIGS. 8A, 8B) of the tubal portion 25*d'* of the first lens group frame 25, respectively. By insertion of the leg portions 26*c*, the second lens group frame 26' is movable in the Z-axis direction while prevented from rotating relative to the tubal portion 25*d'* or the first lens group frame 25. Cam pins 26*a* are provided on the bottom ends of the leg portions 26*c* to protrude outward in the radial direction.

As shown in FIGS. 11, 12, the second lens group frame 26' is biased to the image sensor 29 (downward in FIG. 3) by coil springs 36' provided between the first and second lens group frames 25, 26'. In the present embodiment the coil springs 36' are configured to contact with the mount flange 25*i* at one end inside the tubal portion 25*d'* of the first lens group frame 25 and contact with the support portion 26*b* at the other end inside the leg portions 26*c* of the second lens group frame 26'.

The lens barrel 20' is assembled as follows. First, the coil springs 36' are disposed to contact with the mount flange 25*i* inside the tubal portion 25*d'* of the first lens group frame 25 holding the first lens group 33. Then, the leg portions 26*c* are inserted into the notches 25*j* of the tubal portion 25*d'* to place the second lens group frame 26' holding the second lens group 34. The rotary frame 30 is mounted on the first lens group frame 25 to cover the tubal portion 25*d'*. Here, the protrusions 25*k* of the tubal portion 25*d'* are inserted into the grooves 30*d* of the rotary frame 30 to press down the rotary frame to the intermediate wall 25*c* of the first lens group frame 25 and engage the cam pins 26*a* with the cam grooves 30*b*.

Then, the liner 24 is inserted into the rotary cylinder 23 with the first notches 24*c* of the liner 24 aligning with the insertion positions (bottom ends) of the first and second cam grooves 23*c*, 23*d* and the second notch 24*d* facing the inner wall groove 23*e* of the rotary cylinder 23. The convexes 24*b* of the liner 24 are inserted into the grooves 23*f* and engaged with the ring-like groove 23*b*. The first lens group frame 25 assembled with the second lens group frame 26' and the rotary frame 30 is inserted inside the liner 24 (rotary cylinder 23) with the opening 25*f* of the first lens group frame 25 facing the second notch 24*d* of the liner 24 and the inner wall groove 23*e* of the rotary cylinder 23. The protrusions 25*b* of the first lens group frame 25 are inserted into the first notches 24*c* of the liner 24 and the cam pins 25*a* of the protrusions 25*b* are engaged with the first cam grooves 23*c* of the rotary cylinder 23.

Thereafter, the first and second gears 31, 32 are attached to the first lens group frame 25 as shown in FIG. 4. The first gear 31 is attached via a shaft element 31*a* to the mount 25*g* provided in the opening 25*f* to engage with the inner wall groove 23*e* of the rotary cylinder 23 through the opening 25*f* and the second notch 24*d* of the liner 24. The second gear 32 is attached via a shaft element 32*a* to the mount 25*h* provided on the intermediate wall 25*c* to engage with the first gear 31 and the outer wall groove 30*a* of the rotary frame 30.

The shutter frame 28 and the third lens group frame 27 (third lens group 35) are attached to the rotary cylinder 23 to which the liner 24 and the first lens group frame 25 are attached. Then, the lens barrel 20' is assembled by engaging the slide protrusion 23*a* of the rotary cylinder 23 with the ring-like groove 22*b* of the fixed cylinder 22 and fitting the convex 24*a* of the liner 24 into the concavity 22*a* of the fixed cylinder 22 (FIG. 3).

In the lens barrel 20' in a collapsed state in FIG. 11, the first gear 31 is engaged with the bottom end (top end in FIG. 5) of the inner wall groove 23*e*, the cam pins 25*a* (FIG. 7) of the first lens group frame 25 are engaged with the bottom ends (top ends in FIG. 5) of the first cam grooves 23*c* of the rotary cylinder 23, and the cam pins 26*a* of the second lens group frame 26' are engaged with the top ends (bottom ends in FIG. 9) of the cam grooves 30*b* of the rotary frame 30.

Given a rotary force from the rotary cylinder motor 63 (FIG. 2) of the lens barrel driver unit 60 in the collapsed state, the rotary cylinder 23 rotates inside the fixed cylinder 22 (FIG. 3) without changing its position in the Z-axis direction. The first lens group frame 25 (first lens group 33) is not rotated by engagement of the protrusions 25*b* and the first notches 24*c* of the liner 24 but moved to the object side in the Z-axis direction (leftward in the drawing) by engagement of the cam pins 25*a* with the first cam grooves 23*c* of the rotary cylinder 23. Because of this, the rotary cylinder 23 and the first lens group frame 25 are relatively rotated to thereby rotate the first gear 31 engaged with the inner wall groove 23*e* and the second gear 32 engaged with the first gear 31. By slidable engagement of the protrusions 25*k* of the tubal portion 25*d'* and the ring-like groove 30*c*, the rotary frame 30 engaging with the second gear 32 via the outer wall groove 30*a* is rotated inside the first gear 31 and at the outer circumference of the tubal portion 25*d'* without changing its position relative to the tubal portion 25*d'* in the Z-axis direction. That is, the rotary frame 30 rotates relative to the first lens group frame 25 while changing the position relative to the rotary cylinder 23 and the liner 24 together with the first lens group frame 25 in the Z-axis direction. Then, the second lens group frame 26' is not rotated relative to the tubal portion 25*d'* (first lens group frame 25) but movable in the Z-axis direction due to engagement of the leg portions 26*c* and the notches 25*j* of the tubal portion 25*d'* so that it does not rotate relative to the first lens group frame 25 but moves in the Z-axis direction to the image sensor 29 (rightward in FIG. 11) by engagement of the cam pins 26*a* and the cam grooves 30*b* of the rotary frame 30.

In the lens barrel 20' the first lens group frame 25 moves out as shown in FIG. 12 to the object side (leftward in FIG. 12) in the Z-axis direction while the second lens group frame 26' moves out from the first lens group frame 25 to the image sensor 29. In other words, the second lens group frame 26' recedes from the first lens group frame 25 toward the image sensor 29 (rightward in FIG. 12) in the Z-axis direction. Accordingly, the first lens group 33 (a lens closest to the image sensor 29) and the second lens group 34 are positioned with a proper interval for shooting, bringing the optical system 12 (FIG. 3) in a shooting standby position.

The lens barrel 20' according to the second embodiment has the same basic structure as that of the lens barrel 20 according to the first embodiment so that it can achieve the same advantageous effects.

Specifically, the lens barrel 20' (digital camera 10) in the second embodiment is configured that the first cam groove 23c for moving the first lens group frame 25 (first lens group 33) is provided in the inner wall of the rotary cylinder 23 and the cam groove 30b for moving the second lens group frame 26 (second lens group 34) is provided in the inner wall of the rotary frame 30, which enables an increase in the degree of freedom in which both of the cam grooves 23c and 30b are designed without an increase in the length of the rotary cylinder 23 in the optical axis direction.

Moreover, in the lens barrel 20' (digital camera 10) the rotary frame 30 inside the first lens group frame 25 (outer wall 25e) is configured to surround the tubal portion 25d' as a support for the first lens group 33 so as to move the second lens group frame 26'. Therefore, the diameter of the lens barrel 20' can be reduced from that of the one structured that the second rotary cylinder is provided inside the rotary cylinder 23 with the cam groove on the inner wall and the second liner and second lens group frame are provided inside the second rotary cylinder.

Moreover, according to the lens barrel 20' (digital camera 10), the second lens group frame 26' is configured to be movable relative to the first lens group frame 25 in the Z-axis direction by engagement of the cam pin 26a and the cam groove 30b of the rotary frame 30, and also be biased by the coil springs 36' to the image sensor 29 (rightward in FIG. 12). This can eliminate a backlash of the components for moving the second lens group frame 26'. Accordingly, the second lens group frame 26' can be moved smoothly relative to the first lens group frame 25 as well as the interval between the first and second lens groups 33, 34 in the shooting standby position can be set with precision.

According to the lens barrel 20' (digital camera 10), the rotation transmission system to transmit the rotary force of the rotary cylinder 23 to the first lens group frame 25 is comprised of the inner wall groove 23e in the inner wall of the rotary cylinder 23, two gears (first and second gears 31, 32) and the outer wall groove 30a in the outer wall of the rotary frame 30. Therefore, the rotary velocity of the rotary cylinder 23 or the moving amount of the first lens group frame 25 and the rotary velocity of the rotary frame 30 or the moving amount of the second lens group frame 26' are properly adjustable by setting a gear ratio of the inner wall groove 23e and the outer wall groove 30a appropriately. The rotary direction of the rotary frame 30 can be set properly relative to the rotary cylinder 23 by changing the number of the gears. Accordingly, the degree of freedom in which the two cam grooves 23c, 30b are designed can be improved.

Further, according to the lens barrel 20' (digital camera 10) the inner wall groove 23e constituting the rotation transmission system is formed in the inner wall of the rotary cylinder 23 closer to an object in the Z-axis direction than the first cam groove 23c for moving the first lens group frame 25. This enables an improvement in the degree of freedom of designing the second cam groove 23d for moving the shutter frame 28 as an optical element which is disposed on the image plane side of the second lens group 34 in the Z-axis direction, without decreasing the degree of designing freedom of the two cam grooves 23c and 30d for moving the first and second lens group frames 25, 26.

Thus, it is able to improve the degree of freedom of designing the two cam grooves for moving the first and second lens groups 33, 34 without increasing the size of the lens barrel 20' (digital camera 10).

The above embodiments have described using the digital camera 10 as an example of the imaging device according to the present invention. However, the present invention should not be limited to such an example. The present invention is applicable to a lens barrel and an imaging device and a handheld data terminal device including the same as long as the lens barrel is configured to include a rotary cylinder to engage with the first lens group frame via a cam groove and surround the first lens group frame and be rotated around an optical axis so as to move the first lens group in the optical axis direction as well as a second frame driver configured to engage with the second lens group frame via a cam groove and surround the second lens group frame so as to move the second lens group in the optical axis direction relative to the first lens group frame, wherein the second frame driver is provided inside of the first lens group frame to move the second lens group frame in the optical axis direction relative to the first lens group frame by the rotary force of the rotary cylinder transmitted via a rotation transmission system.

Further, the above embodiments have described the lens barrel 20 (20') including the first lens group 33, second lens group 34, first lens group frame 25, and second lens group frame 26 (26') by way of example. However, the present invention should not be limited to such an example. It is applicable to any lens barrel as long as the second lens group is positioned closer to the image plane than the first lens group.

Furthermore, the above embodiments have described by way of example the second frame driver in a cylindrical form which comprises the rotary frame 30 to surround the stepped tubal portion 25d (tubal portion 25d') and be rotatable without moving relative to the tubal portion 25d or the first lens group frame 25 in the Z-axis direction. The present invention should not be limited to such an example. The second frame driver can be configured arbitrarily as long as it is provided inside of the first lens group frame 25 to move the second lens group frame relative to the first lens group frame in the optical axis direction by the rotary force of the rotary cylinder transmitted via the rotation transmission system.

Further, the above embodiments have described by way of example the rotation transmission system which comprises the inner wall groove 23e in the inner wall of the rotary cylinder 23, the two gears (first and second gears 31, 32), and the outer wall groove 30a in the outer wall of the rotary frame 30. However, the present invention should not be limited to such an example. The rotation transmission system can be configured arbitrarily as long as it transmits to the rotary frame 30 a rotary force of the rotary cylinder 23 to the first lens group frame 25.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A lens barrel including a plurality of lens groups which are shifted to be in a shooting state in which at least a part of the lens groups is moved in an optical axis direction and in a collapsed state in which the lens groups are accommodated in a camera body by collapsing at least a part of the lens groups, the lens barrel comprising:

the plurality of lens groups including a first lens group and a second lens group positioned closer to an imaging plane than the first lens group;

a plurality of lens group frames including first and second lens group frames holding the first and second lens groups, respectively;

a rotary cylinder configured to engage with the first lens group frame via a cam groove and surround the first lens group frame and be rotated around an optical axis so as to move the first lens group in the optical axis direction;

a rotation transmission system configured to transmit a rotary force of the rotary cylinder; and a second frame driver provided inside of the first lens group frame and configured to engage with the second lens group frame via a cam groove so as to move the second lens group in the optical axis direction relative to the first lens group frame by the rotary force of the rotary cylinder transmitted via the rotation transmission system, wherein:

the second frame driver comprises a rotary frame configured to engage with the second lens group frame via a cam groove, and surround the second lens group frame and be rotated around the optical axis, and the rotation transmission system comprises an inner wall groove in an inner wall of the rotary cylinder, a gear engaging with the inner wall groove, and an outer wall groove in an outer wall of the rotary cylinder to engage with the gear.

2. A lens barrel according to claim 1, further comprising a bias element between the first and second lens group frames to bias the second lens group frame in a direction to move away from the first lens group frame.

3. A lens barrel according to claim 1, further comprising a pulling element between the first and second lens group frames to pull the second lens group frame in a direction to approach the first lens group frame.

4. A lens barrel according to claim 1, wherein:

the first lens group is positioned closest to an object among the plurality of lens groups;

the second lens group is next to the first lens group in the optical axis direction; and the inner wall groove of the rotation transmission system is provided at a position closer to an object than an engaging position of the first lens group frame and the rotary cylinder in the optical axis direction.

5. An imaging device comprising the lens barrel according to claim 1.

6. A hand-held data terminal device comprising the lens barrel according to claim 1.

* * * * *